(12) United States Patent
Cho et al.

(10) Patent No.: US 9,802,194 B2
(45) Date of Patent: Oct. 31, 2017

(54) CONTAINER FOR MULTIPLE PARTICLE/LAYER SEPARATIONS AND PARTICLE/LAYER SEPARATION METHOD USING THE SAME

(71) Applicant: Korea Advanced Institute of Science and Technology, Daejeon (KR)

(72) Inventors: Young-Ho Cho, Daejeon (KR); Yoon-Tae Kang, Hongnong-eup (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 72 days.

(21) Appl. No.: 14/402,885

(22) PCT Filed: Apr. 9, 2013

(86) PCT No.: PCT/KR2013/002966
§ 371 (c)(1),
(2) Date: Nov. 21, 2014

(87) PCT Pub. No.: WO2013/176400
PCT Pub. Date: Nov. 28, 2013

(65) Prior Publication Data
US 2015/0151294 A1 Jun. 4, 2015

(30) Foreign Application Priority Data

May 21, 2012 (KR) .......................... 10-2012-0053892
Feb. 15, 2013 (KR) .......................... 10-2013-0016406

(51) Int. Cl.
*B01D 21/28* (2006.01)
*B01L 3/00* (2006.01)
(Continued)

(52) U.S. Cl.
CPC .......... *B01L 3/5082* (2013.01); *B01D 21/262* (2013.01); *B01D 21/28* (2013.01);
(Continued)

(58) Field of Classification Search
CPC .. B01L 3/5082; B01L 3/5021; B01L 3/50215; B01D 21/262; B01D 21/28
(Continued)

(56) References Cited

U.S. PATENT DOCUMENTS 3,512,940 A * 5/1970 Shapiro .................. B01D 33/01
210/450
5,560,830 A * 10/1996 Coleman .............. G01N 33/491
210/121
(Continued)

FOREIGN PATENT DOCUMENTS

JP 2004-180551 * 2/2004
JP 2004-180551 A 7/2004
(Continued)

OTHER PUBLICATIONS

PCT International Search Report of the ISA for PCT/KR2013/002966 dated Jun. 21, 2013.
(Continued)

*Primary Examiner* — Jill Warden
*Assistant Examiner* — Jacqueline Brazin
(74) *Attorney, Agent, or Firm* — Daly, Crowley Mofford & Durkee, LLP

(57) ABSTRACT

A separation container includes a separation tube receiving a sample therein, a first sedimentation part connected to an end portion of the tube, a particle in the sample being deposited by a centrifugal or agitating force, and a separating part provided in the tube and including at least one separating layer which selectively opens and closes the tube.

13 Claims, 16 Drawing Sheets

(51) Int. Cl.
  *B01D 21/26*   (2006.01)
  *B01L 9/00*   (2006.01)

(52) U.S. Cl.
  CPC ......... *B01L 3/5021* (2013.01); *B01L 3/50215* (2013.01); *B01L 9/00* (2013.01); *B01L 2300/0681* (2013.01); *B01L 2300/0832* (2013.01); *B01L 2300/0851* (2013.01); *B01L 2400/0409* (2013.01); *B01L 2400/0478* (2013.01); *B01L 2400/065* (2013.01); *B01L 2400/0638* (2013.01)

(58) Field of Classification Search
  USPC .......................................................... 422/72
  See application file for complete search history.

(56) References Cited

U.S. PATENT DOCUMENTS

| | | | | |
|---|---|---|---|---|
| 2006/0278588 | A1* | 12/2006 | Woodell-May | B01L 3/502 210/787 |
| 2008/0023414 | A1* | 1/2008 | Konrad | B01L 3/50215 210/789 |
| 2010/0155343 | A1* | 6/2010 | Battles | B01L 3/50215 210/789 |
| 2010/0317106 | A1* | 12/2010 | Levine | G01N 33/491 435/372 |

FOREIGN PATENT DOCUMENTS

| | | | |
|---|---|---|---|
| JP | 2004-180551 | * | 2/2007 |
| JP | 3172219 | | 11/2011 |
| KR | 2008-0018587 | * | 2/2008 |
| KR | 20080018587 | * | 2/2008 |
| KR | 2008-10-0861429 | | 10/2008 |
| KR | 10-2010-0054019 | | 5/2010 |
| KR | 200455871 | * | 8/2011 |
| KR | 20-0455871 | * | 9/2011 |
| KR | 20120042533 | * | 5/2012 |

OTHER PUBLICATIONS

PCT Written Opinion of the ISA for PCT/KR2013/002966 dated Jun. 21, 2013.

* cited by examiner

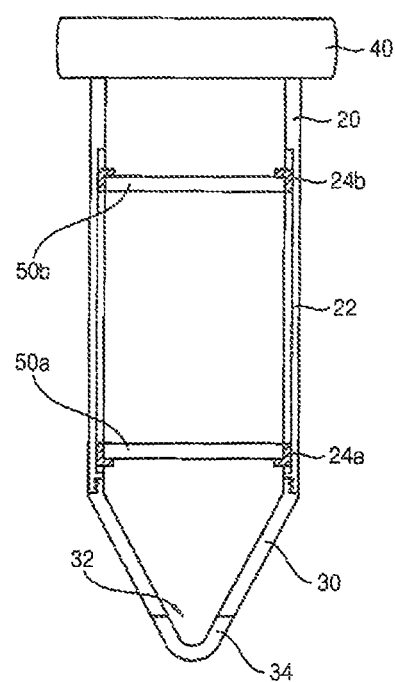

CONTAINER FOR MULTIPLE PARTICLE/LAYER SEPARATIONS AND PARTICLE/LAYER SEPARATION METHOD USING THE SAME

CROSS REFERENCE TO RELATED APPLICATIONS

This application is a National Stage application of PCT/KR2013/002966 filed in the Korean language on Apr. 9, 2013, and entitled "CONTAINER FOR MULTIPLE PARTICLE/LAYER SEPARATIONS AND PARTICLE/LAYER SEPARATION METHOD USING THE SAME," which claims priority under 35 USC §119 to Korean Patent Application No. 2012-0053892, filed on May 21, 2012 and Korean Patent Application No. 2013-0016406, filed on Feb. 15, 2013 in the Korean Intellectual Property Office (KIPO), the contents of which are herein incorporated by reference in their entirety.

BACKGROUND

1. Field

Example embodiments relate to a particle separation container and a particle separation method using the same. More particularly, example embodiments relate to a separation container for centrifuge or agitator and a particle separation method using the same.

2. Description of the Related Art

A centrifuge is a piece of equipment that separates a material using a centrifugal force generated when an object rotates. A mixed fluid such as blood may be separated into a plurality of layers by a centrifuge.

When the separated layers by the centrifuge are repeatedly separated by a centrifuge, an additional container for centrifuge and a fluid transfer process may be necessarily required, resulting loss of the particles. Further, similar problems may occur when the separated layer (particle) is extracted.

An agitator is a device to stir or shake something such as fluid and fluid, fluid and solid, powder, etc. As a fluid including particles having different sizes is agitated continuously by the agitator, the particles in the fluid may be induced to move in a specific direction.

Further, when a fluid including particles having different sizes is injected onto a filter and is agitated continuously, the filter may be prevented from being blocked by a particle layer having a relatively high density and relatively smaller particles may be prevented from being congested by a previously filtered particle having a relatively greater size in early separation stage. However, even though in this case, in order to separate again remaining particles after filtering specific particles by an agitating force, an additional filter exchanger and a fluid transfer process may be necessarily required, resulting loss of the particles. Further, similar problems may occur when the separated particles are extracted.

SUMMARY

Example embodiments provide a separation container capable of performing continuous centrifuge or agitating separations.

Example embodiments provide a particle separation method using the above separation container.

According to example embodiments, a separation container includes a separation tube receiving a sample therein, a first sedimentation part connected to an end portion of the tube, a particle in the sample being deposited by a centrifugal or agitating force, and a separating part provided in the tube and including at least one separating layer which selectively opens and closes the tube.

In example embodiments, the separating layer may close the tube to form a boundary layer within the tube for controlling a flow of the sample through the separating layer.

In example embodiments, the separating layer may be installed to move along the tube.

In example embodiments, the separating part may include first and second holders installed movable along the tube and spaced apart from each other along an extending direction of the tube, and first and second separating layers supported respectively by the first and second holders.

In example embodiments, a guide recess may be formed in an inner surface of the tube and the first and second holders move along the guide recess.

In example embodiments, the separating layer may include at least two unit layers which cross each other to open and close the tube.

In example embodiments, the unit layer may include an elastic material to be deformed elastically by an external force.

In example embodiments, the separating layer may include at least two filter layers which are disposed to overlap with each other, the filter layer having a plurality of holes.

In example embodiments, the filter layers may move relative to each other to control an effective size or shape of a hole which is formed by the overlapped holes of the filter layers.

In example embodiments, the first sedimentation part may be detachably combined with the end portion of the tube.

In example embodiments, the first sedimentation part may include an outlet for discharging the deposited particles.

In example embodiments, the tube may have an opening for collecting separated particles or injecting a medium.

In example embodiments, the separation container may further include a capping part connected to another end of the tube.

In example embodiments, the separation container may further include a second sedimentation part connected to another end portion of the tube.

In example embodiments, the tube may be detachably mounted on a fixing jig, and a particle separated by the separating part is collected using a plunger which applies positive or negative pressure into the tube.

According to example embodiments, in a particle separation method, a separation container is provided, the separation container comprising a separation tube, a first sedimentation part connected to an end portion of the tube, and a separating part provided in the tube and including at least one separating layer which selectively opens and closes the tube. A sample is injected into the tube. The tube is rotated or agitated to perform a first centrifuge or agitating separation such that the sample is separated into a plurality of layers. The separating layer may be used to divide a target layer from the separated layers. The tube is rotated or agitated to perform a second centrifuge or agitating separation such that the target layer is separated into a plurality of layers.

In example embodiments, performing the first centrifuge or agitating separation may include rotating or agitating the tube, with the tube being open by the separating layer.

In example embodiments, dividing the target layer may include isolating and surrounding the target layer by the separating layer, with the tube being closed by the separating layer.

In example embodiments, separating the target layer may further include moving the separating layer along the tube, with the tube being closed by the separating layer.

In example embodiments, the method may further include collecting the separated layer in the separation tube, the separation tube being fixed by a fixing jig.

According to example embodiments, a separation container may include at least one separating part provided in a separation tube and a sedimentation part connected to an end portion of the tube. The separating part, the sedimentation part and a combination thereof may be used to perform multiple centrifugal or agitating separation in one separation tube to separate and extract a desired layer (particles).

Accordingly, the layers (particles) by a centrifugal or agitating force may be separated repeatedly by the centrifugal or agitating separation, without an intermediate process such as fluid transfer process and using an additional separation container, to thereby improve purity and efficiency of particle separation. Further, the separation container may be used to separate a layer/particle based on particle density, particle size, particle shape or a combination thereof.

BRIEF DESCRIPTION OF THE DRAWINGS

Example embodiments will be more clearly understood from the following detailed description taken in conjunction with the accompanying drawings. FIGS. 1 to 11 represent non-limiting, example embodiments as described herein.

FIG. 1 is a view illustrating a separation container in accordance with example embodiments.

FIG. 2 is a cross-sectional view illustrating a separating part installed in a tube of the separation container in FIG. 1.

FIG. 9 is a cross-sectional view illustrating a separation container in accordance with example embodiments.

FIG. 11 is a cross-sectional view illustrating a jig for manipulating the separation container in FIG. 1.

DESCRIPTION OF EMBODIMENTS

Figure 1:
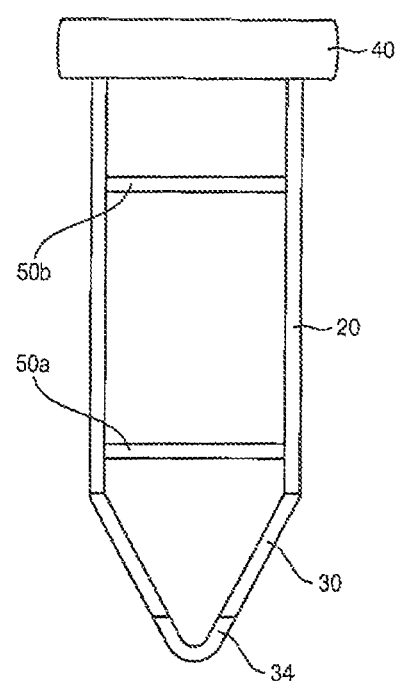

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3A:
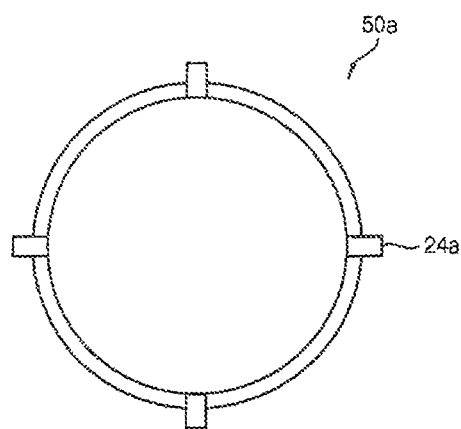
FIGS. 3A and 3B are plan views illustrating a separation layer in FIG. 2.
Figure 3B:
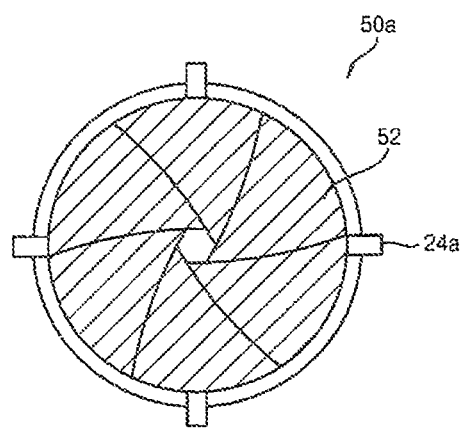

FIG. 1 is a view illustrating a separation container in accordance with example embodiments. FIG. 2 is a cross-sectional view illustrating a separating part installed in a tube of the separation container in FIG. 1. FIGS. 3A and 3B are plan views illustrating a separation layer in FIG. 2.

Referring to FIGS. 1 to 3B, a separation container 10 may include a separation tube 20, a first sedimentation part 30 connected to an end portion of the tube 20, and a separating part provided in the tube 20.

In example embodiments, the separation tube 20 may be a cylindrical tube extending in a longitudinal direction thereof to receive a sample such as flood therein. A scale mark may be printed on an outer surface of the separation tube 20. The first sedimentation part 30 may be detachably combined with the end portion of the tube 20. For example, the first sedimentation part 30 may be combined with the end portion of the tube 20 in a screw connection manner. Alternatively, the first sedimentation part 30 may be formed integrally with the tube 20.

The separation container 10 may further include a capping part 40 connected to another end of the tube 20. After the capping part 40 is removed from the tube 20, the sample may be injected into the tube 20. A surface treatment may be performed on an inner surface of the separation container 10 to change surface characteristics, in order to increase or decrease an adhesive strength or induce a biochemical reaction.

The tube 20 may be connected to a rotating means such as a rotor of a centrifuge or an agitating means of an agitator such that the tube 20 may move along a linear or curved path to perform a separation therein. The first sedimentation part 30 may serve as a distal end portion of the separation tube 20 during centrifugal or agitating separation. Some particles may be deposited in the first sedimentation part 30 under the tube 20 by centrifugal or agitating separation.

In example embodiments, an outlet 32 may be provided in a distal end portion of the first sedimentation part 30 for discharging the deposited particles. For example, a sealing cap 34 may be combined with the outlet 32 in a screw connection manner. Accordingly, after centrifugal or agitating separation, the sealing cap 34 may be removed from the outlet 32, and then, the sediment or upper and lower multi layers separated from the sample may be discharged through the outlet 32 of the first sedimentation part 30.

The separating part may include at least one separating layer 50a, 50b which opens and closes the tube 20 to form a boundary layer within the tube 20 for selectively blocking a flow of the sample. When the tube 20 is rotated or moved along a linear or curved path, the separating layer 50a, 50b may open the tube 20. When the tube 20 is stopped, the separating layer 50a, 50b may close the tube 20 to form the boundary layer. The separating layer 50a, 50b may be installed to move along the tube 20.

In example embodiments, as illustrated in FIG. 2, the separating part may include first and second separating layers 50a, 50b, and first and second holders 24a, 24b respectively supporting the first and second separating layers 50a, 50b. The first and second holders 24a, 24b may be installed to move along the tube 20. The first and second holders 24a, 24b may be spaced apart from each other along the extending direction of the tube 20. For example, the first and second holders 24a, 24b may move along a guide recess 22, which is formed in the inner surface of the tube 20.

Accordingly, the first and second separating layers 50a, 50b may be fixed by the first and second holders 24a, 24b to be spaced apart from each other by a predetermined distance in the tube 20. Additionally, the first and second separating layers 50a, 50b may move relative to each other along the tube 20 to control a distance between the first and second separating layers 50a, 50b.

As illustrated in FIGS. 3A and 3B, the separating layer 50a may include a plurality of unit layers 52 having a structure similar to an aperture mechanism. A plurality of the unit layers 52 may be rotated such that the unit layers 52 overlap with each other to close and open the tube 20. For example, as illustrated in FIG. 3A, when the tube 20 is rotated or moved along a linear or curved path during centrifugal or agitating separation, the unit layers 52 may open the tube 20. As illustrated in FIG. 3B, when the tube 20 is stopped after centrifugal or agitating separation, the unit layers may be rotated by a predetermined angle such that the unit layers 52 may partially or completely close the tube 20 to form the boundary layer for blocking a flow of the sample. The unit layers may have various shapes such as circular or arcuate, or polygonal shape when seen in plan view.

Figure 4A:
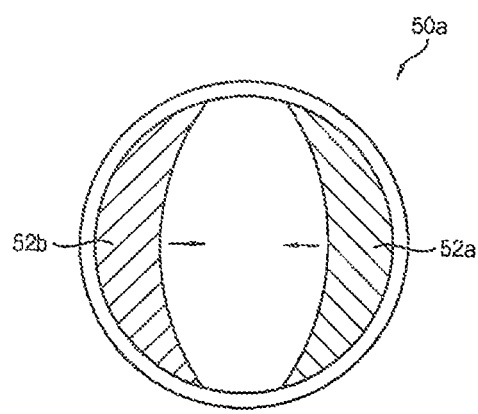
FIGS. 4A and 4B are plan views illustrating a separating layer in accordance with example embodiments.
Figure 4B:
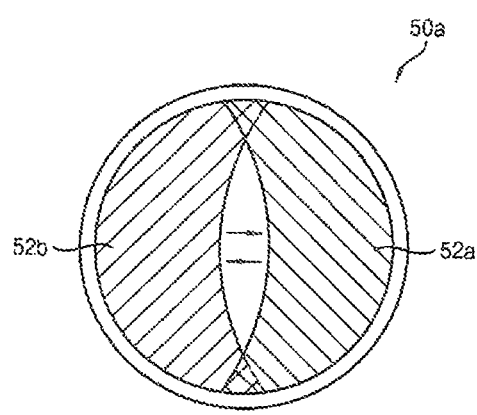

FIGS. 4A and 4B are plan views illustrating a separating layer in accordance with example embodiments.

Referring to FIGS. 4A and 4B, a separating layer 50a may include a first unit layer 52a and a second unit layer 52b crossing each other. The first and second unit layers 52a, 52b may move in opposite directions such that the first and second unit layers 52a, 52b may cross each other to close the tube 20. The first and second unit layers 52a, 52b may be connected to an elastic means (not illustrated). Accordingly, the first and second unit layers 52a, 52b may move in opposite directions to close the tube 20, and may return their original positions by a restitution force of the elastic means. Alternatively, the unit layers may be formed using an elastic material to be deformed elastically by an external force. The unit layers may have various shapes such as circular or arcuate, or polygonal shape when seen in plan view.

Figure 5A:
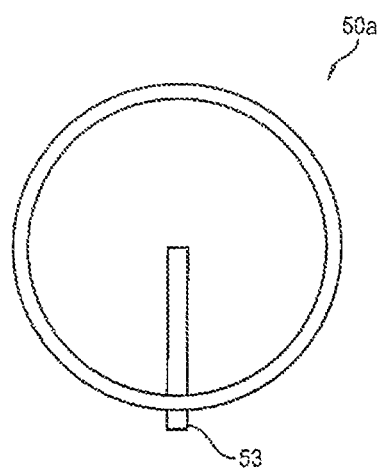
FIGS. 5A and 5B are plan views illustrating a separating layer in accordance with example embodiments.
Figure 5B:
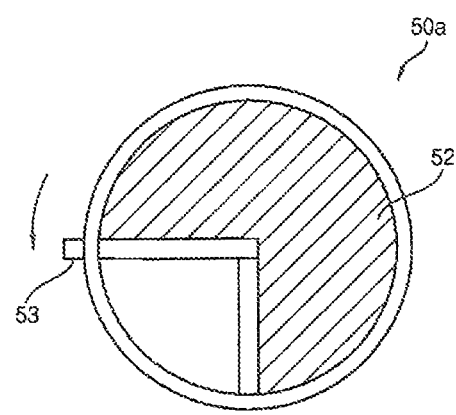

FIGS. 5A and 5B are plan views illustrating a separating layer in accordance with example embodiments.

Referring to FIGS. 5A and 5B, a separating layer 50a may include a unit layer 52 having a structure similar to a folding fan. An end portion of the unit layer 52 may be fixed and another end portion of the unit layer 52 may be connected to a control member 53. Accordingly, as the control member 53 is rotated in a circumferential direction, the unit layer 52 may be unfolded to close the tube 20.

Figure 6A:
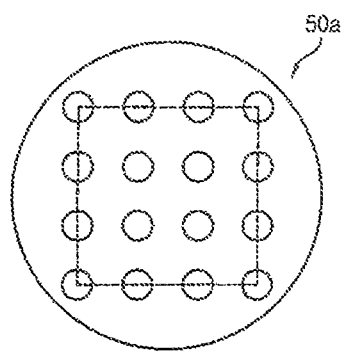
FIGS. 6A to 6C are plan views illustrating a separating layer in accordance with example embodiments.
Figure 6B:
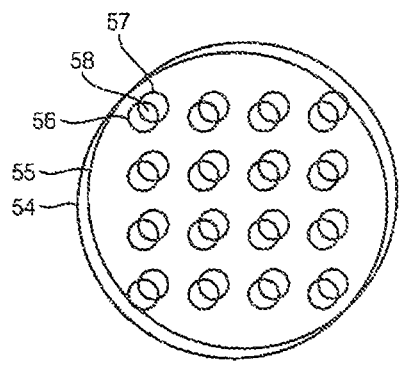
Figure 6C:
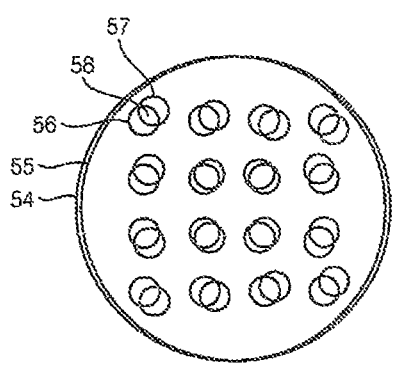

FIGS. 6A to 6C are plan views illustrating a separating layer in accordance with example embodiments.

Referring to FIGS. 6A to 6C, a separating layer 50a may include a first filter layer 54 and a second filter layer 55. The first filter layer 54 may have a plurality of first holes 56 and the second filter layer 55 may have a plurality of second holes 57. The first filter layer 54 and the second filter layer 55 may be disposed to overlap with each other. As illustrated in FIGS. 6B and 6C, the first and second filter layers 56, 57 may move (translate, rotate) relative to each other to control a size of a third hole which is formed by the overlapped first and second holes 56, 57. Accordingly, the separating layer 50a may serve as a filter for selectively passing a particle of a sample.

Figure 7A:
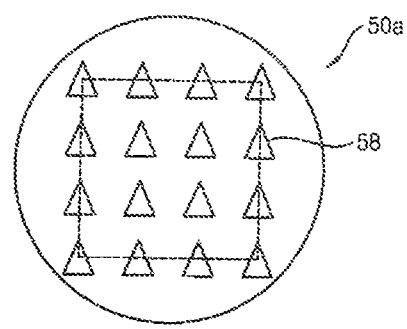
FIGS. 7A and 7B are plan views illustrating a separating layer in accordance with example embodiments.
Figure 7B:
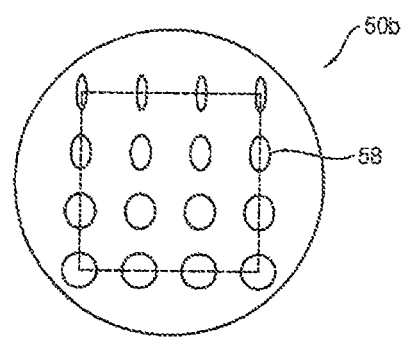

FIGS. 7A and 7B are plan views illustrating a separating layer in accordance with example embodiments.

Referring to FIGS. 7A and 7B, a separating layer 50a may include at least two filter layers which are arranged to overlap with each other. The filter layers may have a plurality of holes respectively. The holes of the filter layers may correspond to each other. The holes of the different filter layers may have various shapes and sizes. Accordingly, holes 58 formed by the overlapped holes may have various shapes and sizes.

Hereinafter, a method of processing a particle using the separation container in FIG. 1 will be explained.

FIGS. 8A to 8E are cross-sectional views illustrating a separation method in accordance with example embodiments.

Figure 8A:
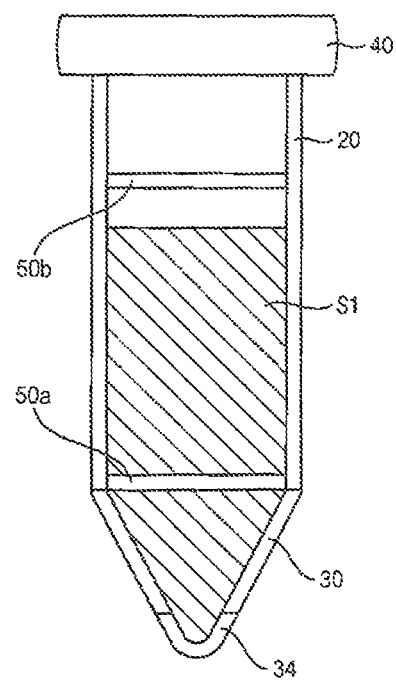
FIGS. 8A to 8E are cross-sectional views illustrating a separation method in accordance with example embodiments.

Referring to FIG. 8A, a sample S1 is injected into a separation tube 20.

In example embodiments, after a capping part 40 is removed from the tube 20, the sample S1 such as blood may be injected into the tube 20. First and second separating layers 50a, 50b may be spaced apart from each other by a predetermined distance along an extending direction of the tube 20.

Figure 8B:
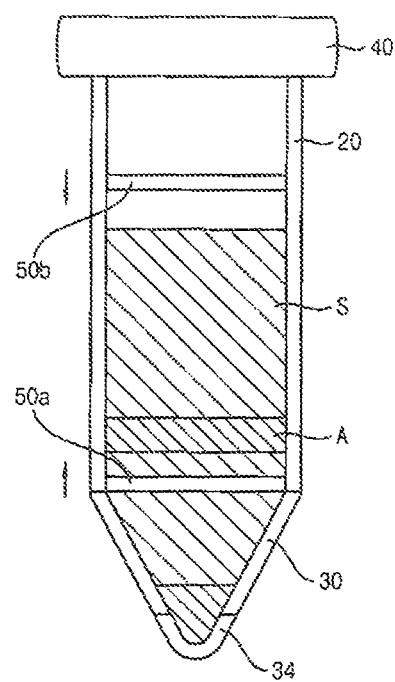
Figure 8C:
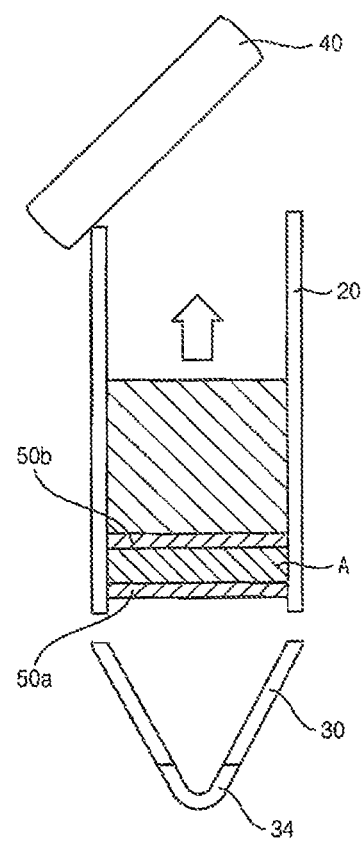

Referring to FIGS. 8B and 8C, after a first centrifugal separation or agitating separation is performed to separate the sample S1 into a plurality of layers, the first and second separating layers 50a, 50b may be used to divide a target layer A from the separated layers.

The tube 20 may be connected to a rotating means such as a rotor of a centrifuge or an agitating means of an agitator and then the tube 20 may be moved along a linear or curved path to perform a first separation process. When the tube 20 is rotated for the first separation process, the separating layers 50a, 50b may be in an open state. That is, the first and second separating layers 50a, 50b may open the tube 20 to allow the sample to pass through the separating layers. Accordingly, the sample S1 may be separated into a plurality of the layers by the first separation process.

Then, the first and second separating layers 50a, 50b may be moved to divide the target layer A from the layers. In particular, the target layer A may be separated to be first positioned between the first and second separating layers 50a, 50b. The first separating layer 50a in an open state may move up toward the target layer A, and the second separating layer 50b in an open state may move down toward the target layer B.

As illustrated in FIG. 8C, when the target layer A is positioned between the first and second separating layers 50a, 50b, the first and second layers 50a, 50b may be changed into a closed state to block a flow of the sample such that the target layer A may be isolated and surrounded between the first and second separating layers 50a, 50b fixed by the holders. Then, the other layers divided from the sample may be discharged to outside.

Figure 8D:
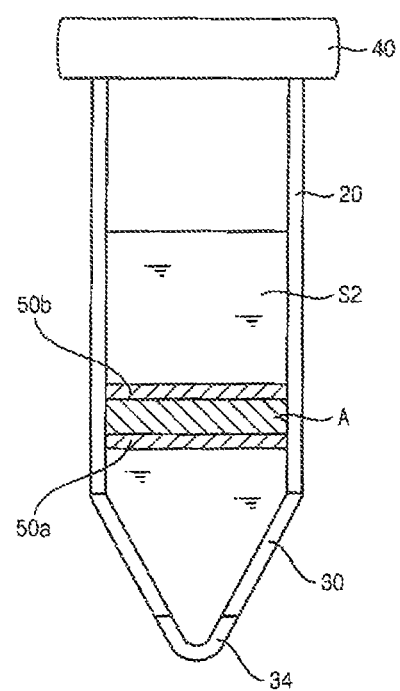
Figure 8E:
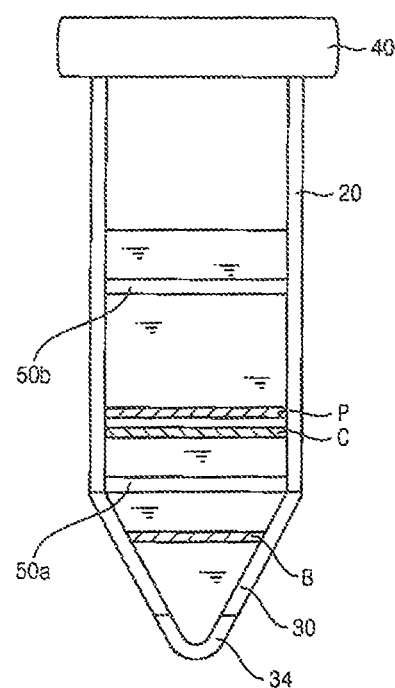

Referring to FIGS. 8D and 8E, after a solution S2 is injected into the separation tube 20, a second separation is performed to separate the target layer A into a plurality of layers.

After the solution S2 such as a homogeneous solution or density gradient medium may be injected into the tube 20, the tube 20 may be rotated to perform a second separation process. When the tube 20 is rotated for the second separation process, the separating layers 50a, 50b may be in an open state. That is, the first and second separating layers 50a, 50b may open the tube 20 to allow the sample to pass through the separating layers. Accordingly, the target layer A may be separated into a plurality of the layers B, C, P by the second separation process.

For example, after the solution S2 is injected into the tube 20, the first separating layer 50a in an open state may move downward and the second separating layer 50b in an open state may move upward. Then, the tube 20 may be rotated or agitated along a linear or curved path to perform the second separation process.

As mention above, these processes may be repeated to perform multiple centrifuge or agitating separation, thereby separating and extracting desired layers (particles). Accordingly, after centrifugal or agitating separation is performed to separate layers (particles), without an intermediate process such as fluid transfer process and using an additional separation container, the centrifugal or agitating separation may be performed again to thereby improve purity and efficiency of particle separation. Further, the separation container may be used to separate a layer/particle based on particle density, particle size, particle shape or a combination thereof.

Figure 9:
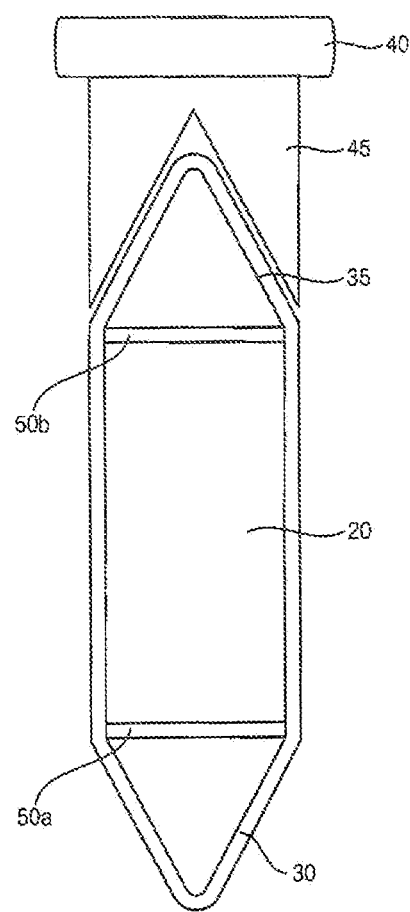

FIG. 9 is a cross-sectional view illustrating a separation container in accordance with example embodiments. The separation container is substantially the same as the separation container described with reference to FIG. 1 except for a second sedimentation part. Thus, the same reference numerals will be used to refer to the same or like elements and any further repetitive explanation concerning the above elements will be omitted.

Referring to FIG. 9, a separation container 11 may further include a second sedimentation part 35 connected to another end portion of a separation tube 20.

The second sedimentation part 35 may be detachably combined with another end portion of the tube 20. The second sedimentation part 35 may be combined with another end portion of the tube 20 in a screw connection manner. A capping part 40 may be connected to the second sedimentation part 35 by a connection member 45.

Accordingly, one of the first and second sedimentation parts 30, 35 may serve as a distal end portion of the separation tube 20 during centrifugal or agitating separation, and the other of the first and second sedimentation parts 30, 35 may serve as an adjacent end portion of the separation tube 20 to opposite to the distal end portion. Thus, the separation container 11 may be used to perform bidirectional centrifugal or agitating separation, thereby improving purity of layer (particle) separation.

Figure 10A:
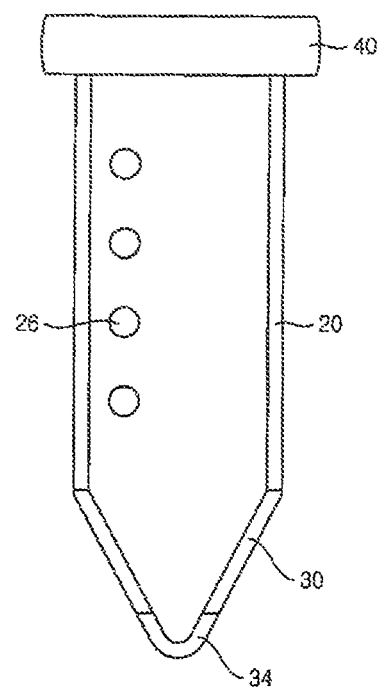
FIGS. 10A and 10B are cross-sectional views illustrating a separation tube in accordance with example embodiments.
Figure 10B:
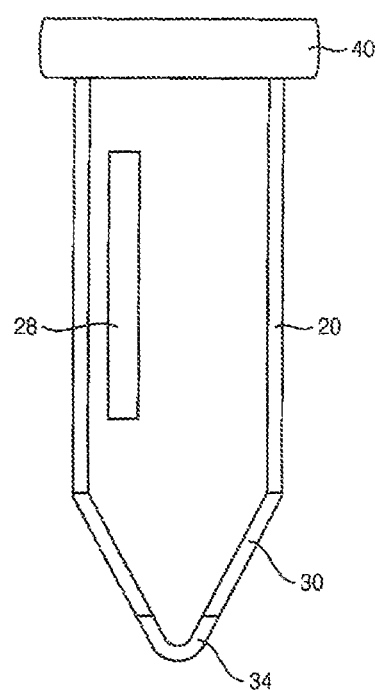

FIGS. 10A and 10B are cross-sectional views illustrating a separation tube in accordance with example embodiments.

Referring to FIG. 10A, a separation tube 20 may have a plurality of input/output openings 26 for extracting layers (particles) separated from a target layer or injecting a medium such as a density gradient solution into the target layer. The input/output openings 26 may be formed to be spaced apart from each other along an extending direction of the tube 20.

Referring to FIG. 10B, a separation tube 20 may have an input/output slit 28 for extracting layers (particles) separated from a target layer or injecting a medium such as a density gradient solution into the target layer. The input/output slit 28 may be formed to extend in an extending direction of the tube 20. Although it is not illustrated in the figure, an opening/closing member may be further provided to open and close the input/output slit 28.

Figure 11:
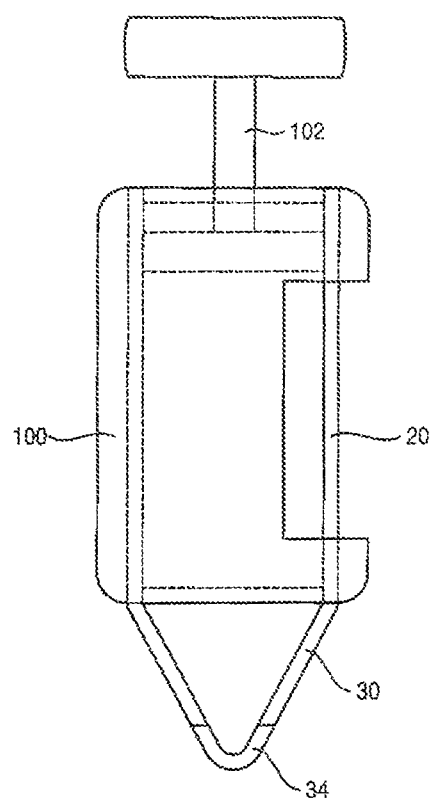

FIG. 11 is a cross-sectional view illustrating a jig for manipulating the separation container in FIG. 1.

Referring to FIG. 11, a separation tube 20 may be detachably mounted on a fixing jig 100. A plunger 102 may be used to apply pressure (positive pressure/negative pressure) to single or multi layers in the separation tube 20 such that a desired layer may be selectively collected in a direction of applying pressure.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A separation container, comprising:
    a separation tube receiving a sample therein;
    a first sedimentation part connected to an end portion of the tube, a particle in the sample being deposited by a centrifugal or agitating force; and
    a separating part provided in the tube and including at least one first and second separating layers being installed to be movable along the tube, operative to selectively open the tube in an open state and close the tube in a closed state, and movable relative to each other in the sample within the tube to adjust a spacing distance between the first and second separating layers, the first and second separating layers configured to close the tube in the closed state to form first and second boundary layers for blocking a flow of the sample therethrough respectively such that a target layer in the sample is isolated and surrounded between the first and second separating layers,
    wherein the first and second separating layers are adapted to be stationary in the open state within the tube during application of the centrifugal or agitating force, and
    wherein the first and second separating layers are operable to move toward the target layer in the open state after the centrifugation or the agitation, the first and second separating layers are operable to change from the open state into the closed state when the target layer is between the first and second separating layers, and the first and second separating layers close the tube in the closed state to block the target layer between the first and second separating layers from flowing through the first and second separating layers respectively.

2. The separation container of claim 1, wherein the separating part further comprises
    first and second holders installed movable along the tube, spaced apart from each other along an extending direction of the tube, and configured to support the first and second separating layers.

3. The separation container of claim 2, wherein a guide recess is formed in an inner surface of the tube and the first and second holders move along the guide recess.

4. The separation container of claim 1, wherein each of the first and second separating layers comprises at least two unit layers which cross each other to open and close the tube.

5. The separation container of claim 4, wherein each of the unit layers includes an elastic material to be deformed elastically by an external force.

6. The separation container of claim 1, wherein each of the first and second separating layers comprises at least two filter layers which are disposed to overlap with each other, the filter layer having a plurality of holes.

7. The separation container of claim 6, wherein the filter layers move relative to each other to control an effective size or shape of a hole which is formed by the overlapped holes of the filter layers.

8. The separation container of claim 1, wherein the first sedimentation part is detachably combined with the end portion of the tube.

9. The separation container of claim 1, wherein the first sedimentation part comprises an outlet for discharging the deposited particles.

10. The separation container of claim 1, wherein the tube has an opening for collecting separated particles or injecting a medium.

11. The separation container of claim 1, further comprising a capping part connected to another end of the tube.

12. The separation container of claim 1, further comprising a second sedimentation part connected to another end portion of the tube.

13. The separation container of claim 1, wherein the tube is detachably mounted on a fixing jig, and a particle separated by the separating part is collected using a plunger which applies positive or negative pressure into the tube.

* * * * *